Walter L. Piasecki
INVENTOR.

United States Patent Office 3,452,487
Patented July 1, 1969

3,452,487
WORKPIECE HOLDER FOR USE WITH THE FACE PLATE OF A LATHE
Walter L. Piasecki, Rte. 2, Box 132, Ravenna, Mich. 49451
Filed Dec. 5, 1966, Ser. No. 599,054
Int. Cl. B24b 41/06; B23b 33/00, 25/06
U.S. Cl. 51—217                      4 Claims

ABSTRACT OF THE DISCLOSURE

This disclosure involves the provision of adjustable clamping jaws on the face plate of a lathe with the jaws constituting a work holder for holding a workpiece so that the same may be acted upon by a tool, such as a grinding machine. The jaws are mounted on the face plate for various adjustments so as to support different workpieces in operative association and predetermined positions to the face plate whereby the workpieces, as they are rotated by the lathe, may be worked upon by various tools, such as a grinding machine.

---

An important object of the present invention is to provide a simple, economical, efficient and effective clamping arrangement for operative association with a face plate of a lathe which clamping arrangement is easily adjustable laterally and longitudinally of the face plate so as to securely attach various workpieces in predetermined relation to the face plate and for rotation with the face plate.

Another important object of the present invention is to provide a work holder for use with the face plate of a lathe, such work holder including a pair of cooperative and complemental jaws which are mounted in a simple and economical manner on the face plate for adjustment relative to each other in planes parallel and perpendicular to the face plate.

A still further important object of the present invention is to provide, in association with the face plate of a lathe, a work holder for supporting the end of a workpiece in a manner so that the workpiece can be worked upon by a tool means, such as a grinding machine, as the workpiece is rotated by the lathe and the rotating face plate of the lathe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the work holder, per se, showing the same in disassociation with the face plate of the lathe.

Figure 1:
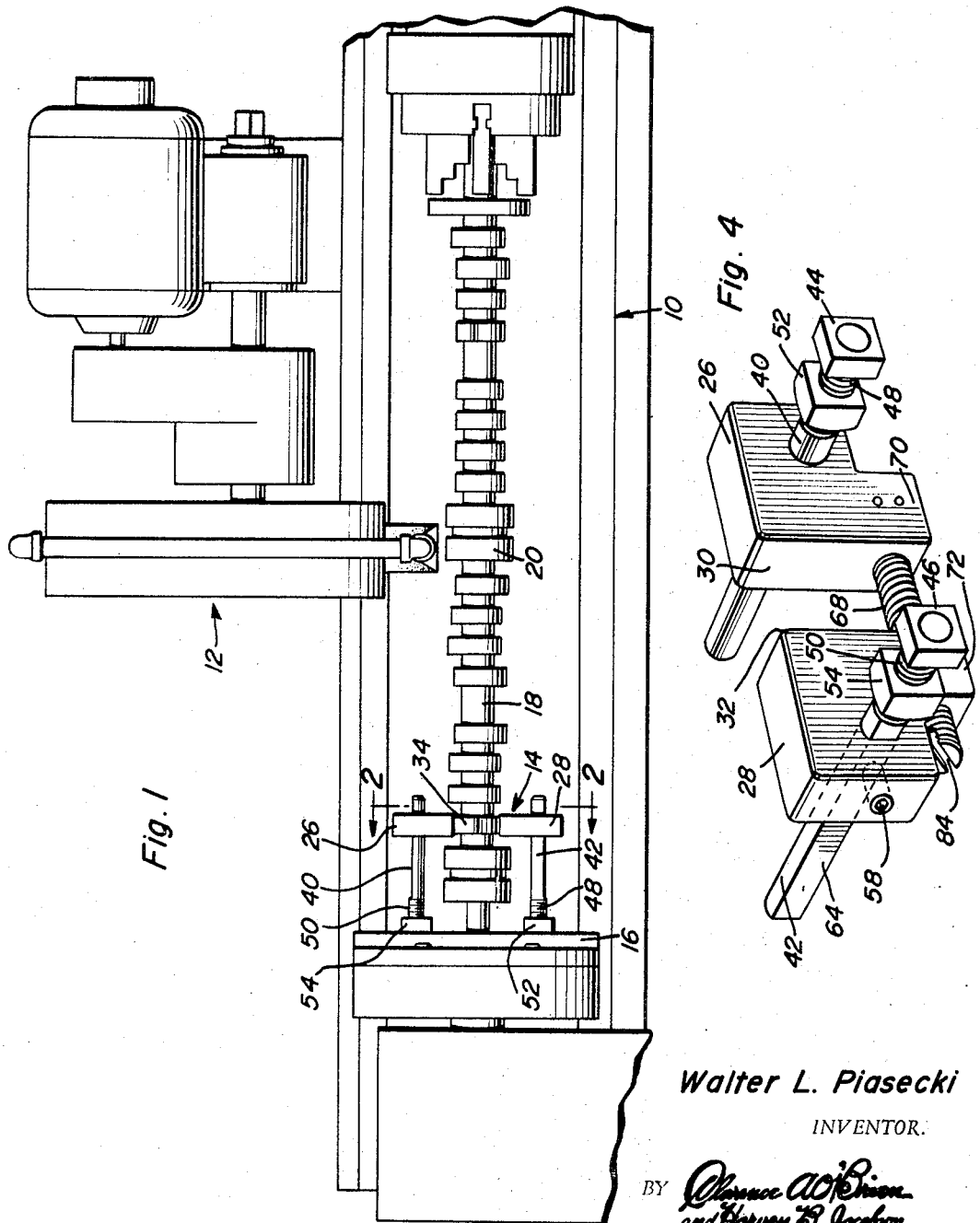
FIGURE 1 is a top plan view of a lathe with a work holder, constructed in accordance with the present invention, in operative association with the face plate of the lathe for supporting one end of a workpiece which is acted upon by a grinding machine, shown in top plan, and such machine being shown for exemplary purposes.

Referring now more particularly to the accompanying drawings, and initially to FIGURE 1, the reference numeral 10 generally designates a conventional lathe, while the reference numeral 12 generally designates a conventional grinder or grinding machine. A work holder, designated by the reference numeral 14, is constructed in accordance with the present invention and is adapted to be structurally and adjustably associated with the face plate 16 of the lathe so as to support one end of a workpiece 18, such as a camshaft, which is supported and rotated by the lathe so that the transversely orientated grinder 12 can be utilized to rough and finish grind the cams 20 of the camshaft.

Figure 2:
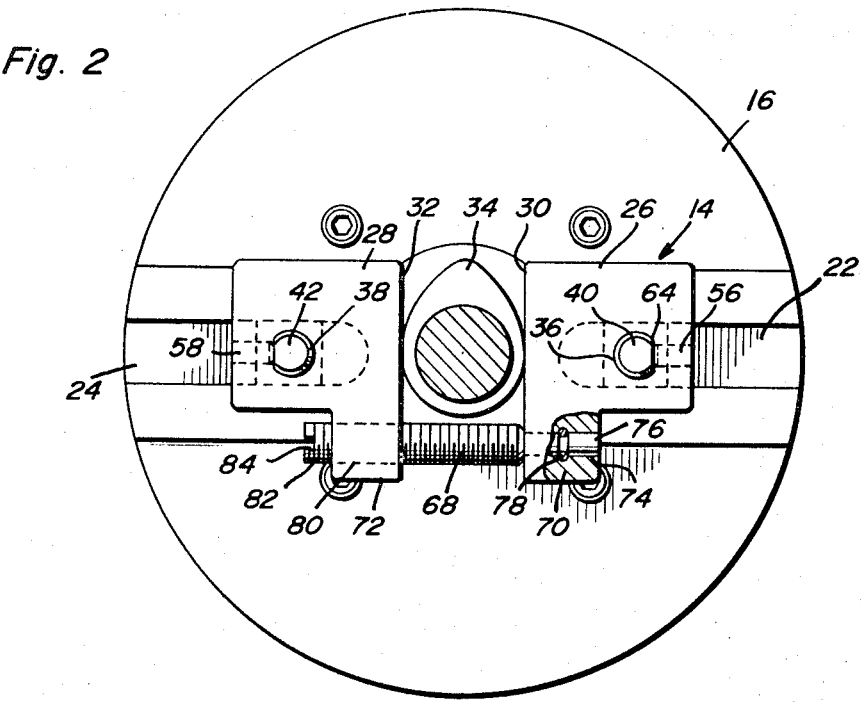
FIGURE 2 is a vertical transverse sectional view, taken substantially on line 2—2 of FIGURE 1 and showing in front elevation the work holder of the present invention.
Figure 3:
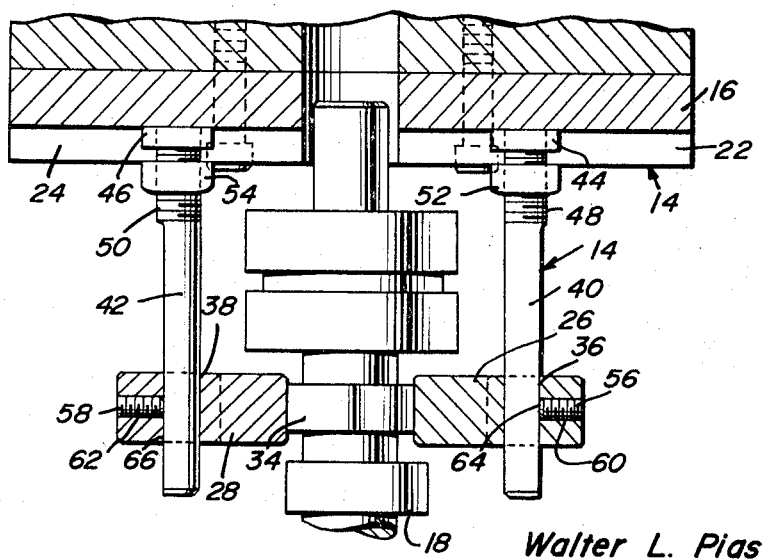
FIGURE 3 is a detailed, enlarged longitudinal sectional view of the work holder.

Referring more particularly to FIGURES 2–4, the face plate 16 is provided with diametrically opposed undercut grooves 22 and 24 and the work holder 14 is formed so as to be mounted within such aligned grooves 22 and 24.

The work holder 14 comprises a pair of complemental jaws 26 and 28, having confronting and cooperative jaw faces 30 and 32 which are adapted to securely clamp on the workpiece, as for example, on the cam 34, as shown in FIGURES 2 and 3. The jaws are mounted for adjustment in planes parallel and perpendicular to the face plate 16 and each of the jaws is provided with a longitudinal aperture 36 and 38, such apertures or openings being disposed parallel to the long axis of the lathe bed and being adapted to receive supporting studs or pins 40 and 42 on which the jaws are slidably disposed.

The pins 40 and 42 are provided with inner enlargements or head ends 44 and 46 which are slidably disposed within the grooves 22 and 24 and the inner end portions 48 and 50 of the pins are exteriorly threaded to receive locking nuts 52 and 54 which cooperate with the heads 44 and 46 to lock the pins tightly against movement in the grooves 22 and 24, the locking nuts cooperating with the heads so as to clamp the heads in place in the grooves 22 and 24.

The jaws 26 and 28 are slidable on the pins 40 and 42 along the longitudinal extent of the pins and are locked in adjusted positions along the longitudinal extent or axis of the pins 40 and 42 by radial setscrews 56 and 58 which extend through interiorly threaded radial bores 60 and 62 on the outer sides of the jaws and have their inner ends engaging the flat outer sides 64 and 66 of the pins, as shown clearly in FIGURE 2, whereby a more secure locking of the jaws 26 and 28 on the pins 40 and 42 can be realized.

The jaws 26 and 28 are adjusted laterally of each other, that is, in a plane parallel to the plane of the face plate so as to determine the spacing between the clamping faces 30 and 32 by a threaded adjustment bolt 68. In this respect, the jaws 26 and 28 are provided with depending tail portions 70 and 72. The tail portion 70 of the jaw 26 is formed with a lateral bore 74 within which the coaxially reduced plain or unthreaded end portion 76 of the adjustment bolt 68 is rotatably disposed, such end portion being held in place by a locking ring 78. The depending tail portion 72 of the jaw 28 is formed with an internally threaded bore 80 that is laterally disposed and aligned with the bore 74 and is adapted to receive the shank of the threaded adjustment bolt 68, which has an outer end portion 82 provided with a kerf 84 for accommodating the bit of a screwdriver or other adjustment tool.

It can thus be appreciated that the jaws 26 and 28 are interconnected by the bridging threaded adjustment bolt 68 connected to the depending tail portions 70 and 72 with the threaded adjustment bolt 68 lying below the workpiece 34 or any portion thereof, as shown in FIGURE 2. By backing off the locking nuts 52 and 54, the jaws 26 and 28 can be adjusted bodily relative to each other through the medium of the threaded adjustment bolt 68. Also, with the threaded adjustment bolt 68 moved so as to space the jaw faces 30 and 32 apart and the set screws 56 and 58 unscrewed, the jaws 26 and 28 can be moved bodily toward and away from the face plate on the guide or support pins 40 and 42.

In use, the jaws 26 and 28 are first positioned on the pins 40 and 42 in the desired spacement, relative to the face plate, depending upon the particular workpiece to be held. The jaws are moved relative to each other, by use of the threaded adjustment bolt 68. It is realized that once the jaws 26 and 28 have been moved to the set position on the pins 40 and 42 they are locked securely in place by tightening the set screws 56 and 58 so that the jaw 26 is then in integral association with the pin 40 and the jaw 28 is in integral association with the pin 42. After this adjustment, the jaws are moved towards each other so as to have the jaw faces 30 and 32 clampingly engage the workpiece such movement being accomplished through the rotation of the bolt 68. When the jaw faces have securely and clampingly engaged the workpieces, the locknuts 52 and 54 are tightened so as to hold the jaws in the set position.

The workpiece, for example, the camshaft 18, is then securely held at one end in attachment to the rotating face plate and the workpiece is rotated so that the grinder 12 can efficiently and effectively operate on the cams of the camshaft, the camshaft being so effectively held that rough grinding may first be carried out and then finish grinding may be effected.

One of the advantages of this particular type of clamping arrangement is that with the adjustment being made by bolt 68, the workpiece is always engaged equally on both sides thereby preventing its movement out of the workpiece holder. This arrangement is much safer than conventionally employed "dogs" which are used to hold a workpiece in lathe applications.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with the face plate of a lathe, said face plate having aligned undercut grooves in its face, a work holder comprising a pair of cooperating jaws adapted to clampingly engage and hold a workpiece, said jaws being disposed parallel to the face plate and having confronting clamping faces to engage a workpiece, guide pins mounted in the grooves in the face plate and projecting outwardly therefrom generally perpendicular thereto, said jaws having apertures for slidable mounting on the guide pins, means carried by the jaws for locking the jaws in selected positions on the pins, means adjustably interconnecting the jaws for moving the jaws and pins laterally towards and away from each other and locking means for securing the pins in adjusted positions in the grooves.

2. The structure as defined in claim 1 wherein said means adjustably interconnecting the jaws including a threaded adjustment bolt, said bolt being in screw-threaded engagement with one of said jaws, said bolt having an unthreaded portion rotatably engaged and longitudinally stationarily connected with the other jaw for moving the jaws towards and away from each other upon rotation of the bolt.

3. The structure as defined in claim 2 wherein each of said jaws is provided with an offset portion, said bolt being engaged with the jaws at the offset portion thereof to enable a workpiece to be engaged by the jaws without interference by the threaded adjustment bolt.

4. The structure as defined in claim 3 wherein said guide pins each have a flat longitudinal surface, said means carried by the jaws for locking the jaws in selected position on the pins including setscrews lockingly engaging the flat portions of the pin.

References Cited

UNITED STATES PATENTS

| | | | |
|---|---|---|---|
| 928,657 | 7/1909 | Howell | 269—203 X |
| 1,178,203 | 4/1916 | Angart | 82—40 |
| 2,339,897 | 1/1944 | Wetzler | 269—203 X |
| 2,360,175 | 10/1944 | Tiede | 269—244 X |
| 2,421,226 | 5/1947 | Tiede | 279—8 |
| 2,464,297 | 3/1949 | Ertl | 269—203 X |
| 2,568,233 | 9/1951 | Hamilton | 269—203 X |
| 2,658,415 | 11/1953 | Barowsky | 269—240 X |

MYRON C. KRUSE, *Primary Examiner.*

U.S. Cl. X.R.

82—40